United States Patent Office 2,720,490
Patented Oct. 11, 1955

2,720,490

PREVENTION OF CORROSION AND SCALE FORMATION

William F. Oxford, Jr., Beaumont, Tex., assignor to Sun Oil Company, Philadelphia, Pa., a corporation of New Jersey No Drawing. Application January 19, 1954,
Serial No. 405,027

6 Claims. (Cl. 210—23)

This invention relates to a method of inhibiting scale formation and corrosion in water systems.

In industrial operations where large quantities of water are used, such as in heating and cooling systems employing water as heat transfer medium, the equipment through which the water is circulated is often subject to fouling due to deposition of scale on surfaces contacted by the water. The principal scale forming material is calcium carbonate which results from decomposition of calcium bicarbonate present in the water. Surfaces of metal equipment such as pipes, heat exchangers, condensers and the like also are subject to corrosion which progresses in spite of the presence of scale on the surface. The corrosion generally is evidenced by pitting of the metal beneath the scale. During prolonged operation the combined effects of scaling and corrosion result in serious difficulties such as increased resistance to heat transfer, decrease in water circulating rate, plugging and leakage.

In accordance with the present invention scale deposition and corrosion within water systems are avoided or minimized. This is done by forming a protective film on the surfaces of the equipment by treating the surfaces with an acylated aminoalcohol and with an acylated polyamine, these two treating materials being of the types hereinafter more specifically described; and thereafter circulating through the system water to which said treating materials have been added in sufficient amount to maintain the protective film. This procedure has been found to be capable of substantially eliminating the scale formation and corrosion even when the system is operated continuously for very long periods of time.

It has been proposed heretofore to use certain types of acylated derivatives of aminoalcohols for inhibiting scale deposition in water systems. Such derivatives are described for this purpose in U. S. Patent No. 2,589,195, and are presently available commercially. Actual practice in which this type of material has been employed as scale inhibitor has shown, however, that while scale deposition is reduced it is not necessarily substantially eliminated.

The acylated derivatives of aminoalcohols heretofore have not been considered to have any utility as corrosion inhibitors and in fact have been found to result in an increased corrosion rate in some instances.

It has also been proposed to utilize certain types of acylated polyamines to inhibit corrosion in oil flowing systems, such as in oil wells, refineries and the like. For this purpose, Patent Re. 23,227 discloses the use of numerous acylated polyamines of the types including imidazolines, aminoimidazolines and amidoimidazolines and Patent No. 2,466,517 discloses the use of similar compounds as well as acylated polyamines which are diimidazolines. Patent No. 2,598,213 discloses for the same purpose numerous examples of acylated polyamines which are amides. Materials of these various types are good corrosion inhibitors for oil flowing systems but they have not been considered as especially effective corrosion preventers in water systems, particularly when the water is subjected to aeration; nor have they been thought to have any value whatever in inhibiting scale deposition in water systems.

I have now found that a combination of certain types of compounds within the two general classes referred to above, namely, acylated aminoalcohols and acylated polyamines, have unexpected beneficial effects in water circulating systems when applied in the manner of the present invention. The presence of the acylated polyamine, which had not been thought to have scale preventing qualities, results in a marked decrease in scale formation as compared to the use of the acylated aminoalcohol in the absence of the polyamine derivative. On the other hand, the presence of the acylated aminoalcohol, in amount which has been found to cause an increase in corrosion rate in the absence of the acylated polyamine, has been found to result actually in a reduction of the corrosion rate in comparison with the use of the acylated polyamine alone. In other words, the combination of these materials seems to result in each having a beneficial effect on the inhibiting action of the other.

The acylated derivative of a basic aminoalcohol employed in practicing the present invention can be described as follows: It is the acylation product of a condensation polymer of triethanolamine, which can be either the condensation dimer or trimer or mixtures thereof, with at least one RCO which is the acyl radical of a monocarboxy detergent-forming acid having 10–20 carbon atoms and preferably 15–20 carbon atoms. These triethanolamine dimer and trimer condensation polymers correspond essentially to the following forms:

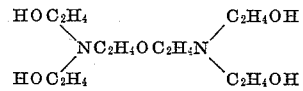

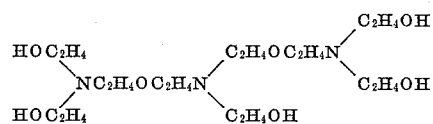

To obtain the desired acylated derivatives these aminoalcohols are reacted with a material which will supply the acyl radical RCO in which R has 9–19 carbon atoms. Examples of such material are palmitic acid, oleic acid, stearic acid, ricinoleic acid, abietic acid, castor oil, tall-oil and the like.

The preparation of acylated aminoalcohols as above specified can be carried out as described in Patent Nos. 2,470,831 and 2,589,195. As one example of such preparation, a mixture of triethanolamine condensation polymers having formulas as set forth above and containing about 75% of the trimer and 25% of the dimer is reacted with castor oil, using three mols. of the polymers per mol. of castor oil. The mixture is heated to 160–260° C. for 6–25 hours until substantially all of the triricinoleic present in the castor oil has disappeared. The resulting product can be used in accordance with the invention. Preferably, the product is used in the form of a salt obtained by neutralization with an inorganic or organic acid, for example, glacial acetic acid. In place of castor oil talloil or a detergent-forming acid which will supply the specified number of carbon atoms for the acyl group can be used and the reaction conducted in a similar manner.

The acylated polyamines employed according to the invention are acylation products of RCO where R is an aliphatic, hydroxyaliphatic, or abietyl radical having 9 to 19 carbon atoms, and preferably 14 to 19 carbon atoms, with an alkylene polyamine having the formula: $NH_2(CH_2CH_2NH)_nH$ where $n$ is an integer from 2 to 7. The radical R may be saturated or unsaturated (having one or more double bonds). More particularly, the acylated polyamines employed according to the invention can be of any of the following types:

(1) 1-aminoimidazolines having the formula

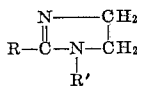

(2) 1-amidoimidazolines constituting acylation products of RCO with at least one amino group in the side chain of such 1-aminoimidazoline.

(3) Diimidazolines having the formula

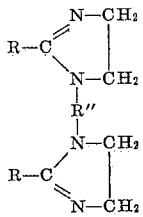

(4) Amidopolyamines constituting acylation products of RCO with at least one amino group of a polyamine having the formula $NH_2(CH_2CH_2NH)_nH$ In each of the foregoing formulas R is an aliphatic, hydroxyaliphatic or abietyl radical having 9–19 carbon atoms, R' is an aminoaliphatic radical containing 2–12 carbon atoms and 1–6 nitrogen atoms, R" is either the ethylene radical or aminoaliphatic radicals containing 4–10 carbon atoms and 1–4 nitrogen atoms, and $n$ is an integer from 2 to 7 inclusive. The acylated polyamines embraced within the foregoing definition may be used as such or in the form of their salts with various organic or inorganic acids, for example, acetic acid, hydroxyacetic acid, sulfuric acid, hydrochloric acid, phosphoric acid, etc. The water and oil solubilities of the neutralized product can be varied and regulated by suitable selection of the neutralizing acid.

The preparation of acylated polyamines embraced within the foregoing definition can be carried out according to known procedures. Patent Nos. 2,466,517 and Re. 23,227 describe numerous examples of the preparation of aminoimidazolines, amidoimidazolines and diimidazolines suitable for use in practicing the invention, while Patent No. 2,598,213 describes the preparation of amidopolyamines which can be employed for the present purpose. Reference should be made to these patents for details in the preparation of such compounds.

By way of example, the acylated polyamine material prepared according to the invention may be an acylation product of a $C_{16}$ saturated fatty acid with triethylene tetramine, with tetraethylene pentamine, or with mixtures of higher polyethylene polyamines having 6, 7, and 8 nitrogen atoms, or of a $C_{18}$ saturated fatty acid with those same amines, or of oleic acid with those amines. As a general rule it is preferred to use a mixture of acylation products including aminoimidazolines, diimidazolines, amidoimidazolines, and amidopolyamines including mono- and diamines. For example, acylation reactions between tetraethylene pentamine and palmitic acid can be conducted to produce the following materials for use in admixture with each other as the acylated polyamine additive:

Aminoimidazoline

$CH_2CH_2(NHCH_2CH_2)_2NH_2$

Amidoimidazolines

Acylation products of $C_{15}H_{31}CO$— with at least one nitrogen atom in the side chain of the above aminoimidazoline.

Diimidazoline

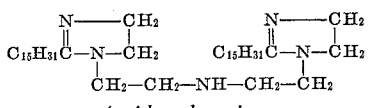
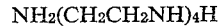

Amidopolyamines

Acylation products of $C_{15}H_{31}CO$— with at least one nitrogen atom of tetraethylene pentamine, $NH_2(CH_2CH_2NH)_4H$ Other acylation products may also be present.

The procedure recommended for practicing the invention comprises a pre-treatment of the water circulating system with a mixture of the two specified types of compounds to form a protective film on metal equipment surfaces. For this purpose the inhibiting agents could be used in the concentrated form in which they are available commercially but this generally would be uneconomic as it would require excessively large amounts of the materials. It is preferred to effect the pre-treatment by means of an aqueous mixture containing from 2 to 20 parts of each of the specified inhibiting agents for each 10,000 parts of water by volume. The ratio of the two inhibiting agents to each other in the aqueous mixture may be varied considerably but it is preferred to use about equal parts of each. After a protective film has been applied to the equipment surfaces by pre-treatment in this manner, the system is then put into operation and the two inhibiting agents are added to the circulating water in small amounts sufficient to maintain the protective film. The amounts of inhibitors that should be added to insure proper maintenance of the protective film may vary depending upon the composition of the inlet water and the conditions of operation within the system but generally will lie within the concentration range of 5–150 p. p. m. of each. The two additives suitably may be introduced into the water system in about equal amounts, although other ratios of the two are effective.

The water system in which the present invention is employed may be one in which the water is circulated only once through the equipment and then is discarded or used in some other operation, or it may be one in which the water is continuously recycled through the system and only enough water is added to compensate for losses. The system may include an aeration zone, in which oxygen becomes absorbed in the water, without impairing the effectiveness of the inhibitors. The system may also include high temperature zones, such as heat exchangers, in which scale deposition and corrosion normally would be particularly troublesome in the absence of the combination of inhibitors.

By way of illustration of the effectiveness of the combined inhibitors in accordance with the invention, the following results obtained in the operation of a hydrocarbon gas compressor plant may be considered. The plant included heat exchanges and an aeration cooling tower through which water was continuously cycled. Prior to testing the effectiveness of the inhibitor combination according to the invention, the plant had been operated for 15 months while subjecting the water to a conventional treatment for alleviating scale troubles, such treatment involving the addition of sodium hexametaphosphate and sodium chromate to the water while regulating its pH value by addition of sulfuric acid. After operating with such treatment for 15 months, inspection of the heat exchanger showed that heavy scale formation had occurred. Removal of the scale by mechanical means revealed that extensive corrosion of the metal had taken place as evidenced by deep pitting.

The equipment was then given a pre-treatment with an aqueous mixture containing about 500 p. p. m. of an acylated derivative of triethanolamine condensation polymers marketed under the trade name of "SP–8" and about 500 p. p. m. of a mixture of acylated polyamines marketed under the trade name of "Kontol." The "SP–8"

was a mixture of products derived by attaching to the molecules of a mixture of dimer and trimer triethanolamine condensation polymers acyl groups including the oleyl, ricinoleyl and abietic radicals and neutralizing the product with glacial acetic acid. The "Kontol" was a mixture of acylated polyamine products obtained by acylating triethylene tetramine with stearic acid under various conditions and blending the products to produce a composition roughly about as follows on a weight basis: 10–15% aminoimidazoline; 20% diimidazoline; 50–60% amidoimidazoline; 5–10% mono-amide; 5% di-amide; and a small amount not over 10% of such components as nitrile polymer, unreacted amine, and unreacted fatty acid. The mixture of acylated reaction products was neutralized with hydroxyacetic acid and used in the resulting salt form.

Following pre-treatment of the equipment with the combination of "SP–8" and "Kontol," a test operation was then conducted for 4 months. During this time the two inhibitors were added to the make-up water introduced into the system in amount of about 80 p. p. m. of each. The equipment was then inspected, and it was found that de-scaling had been occurring and that no additional corrosition was evident. After mechanically cleaning residual scale from the equipment, test operation with the two inhibitors added to the make-up water in concentration varying from about 80 p. p. m. to about 40 p. p. m. Each was continued for 15 more months. Inspection then showed that substantially no scale formation or additional corrosion had occurred.

By way of contrast, it was found during another operating period of the same plant that when only the acylated aminoalcohol designated as 'SP–8" was added to the water system without addition of the "Kontol," considerable scale deposition took place within a two month period and the equipment was not protected against corrosion.

The following laboratory data illustrate the unexpected improvement in corrosion inhibition effected by combination of the two types of inhibiting agents:

Corrosion tests were made on steel coupons, immersed in circulating water having approximately the composition of the feed water of the gas compressor plant referred to above. Three coupons were tested and the results were averaged for each of the following conditions: (1) Water without additive, (2) Water with 50 p. p. m. of the acylated aminoalcohol designated "SP–8," (3) Water with 50 p. p. m. of the acylated polyamine product designated "Kontol," and (4) Water with 50 p. p. m. of each. The corrosion rate in terms of mils/year was measured for each of these four conditions. Average corrosion rate values were as follows:

|  | Mils/year |
|---|---|
| (1) Water | 31.8 |
| (2) Water and "SP–8" | 36.9 |
| (3) Water and "Kontol" | 12.2 |
| (4) Water and both agents | 9.2 |

It will be noted that the presence of the "SP–8" alone at 50 p. p. m. caused an increase in the corrosion rate. The "Kontol" alone at 50 p. p. m. effectively reduced the corrosion rate. However, when both of the agents were present in 50 p. p. m. each, a still greater reduction in corrosion rate resulted, instead of the adverse effect that would have been expected due to the presence of the "SP–8."

The importance of the hereindescribed pre-treating step in forming a protective coating on the metal surfaces initially is illustrated by other laboratory data obtained on steel test coupons immersed in circulating aerated water. One set of tests was made without any pre-treatment of the coupons, while another set was made with coupons which had been pre-treated by contact for 5 days with water containing 1000 p. p. m. of each of the two agents designated "SP–8" and "Kontol." The water used for each set of corrosion tests contained 13 p. p. m. of each of the additives. Weight losses of the coupons were determined after 100 hours of exposure to the circulating water and found to be approximately as follows:

|  | Weight loss, mg. |
|---|---|
| Without pre-treatment | 88 |
| With pre-treatment | 18 |

The results show that the pre-treatment effected a considerable reduction in the rate of corrosion.

Results substantially similar to those described above can be obtained by substituting for the described "SP–8" and "Kontol" products, respectively, other acylated derivatives of triethanolamine condensation polymers and other acylated polyamines as herein specified. For the latter it is generally preferred to employ a mixture of acylated polyamine compounds in proportions about as specified above for the "Kontol" product. These materials may be used as such or in the form of a salt of various organic and inorganic acids.

This application is a continuation-in-part of my co-pending application Serial No. 286,028, filed May 3, 1952, now abandoned.

I claim:

1. Method of inhibiting scale formation and corrosion in a water circulating system containing water normally tending to cause scale deposition and corrosion which comprises forming a protective film on metal surfaces of equipment in said system by treating said surfaces with an acylated aminoalcohol and with an acylated polyamine and thereafter circulating through the system such water to which has been added, in sufficient amount to maintain said protective film, an acylated aminoalcohol and an acylated polyamine; said acylated aminoalcohol being the acylation product of a triethanolamine condensation polymer selected from the group consisting of dimer and trimer triethanolamine condensates with at least one RCO, which is the acyl radical of a monocarboxy detergent-forming acid having 10–20 carbon atoms; and said acylated polyamine being selected from the group consisting of (a) 1-aminoimidazolines having the formula

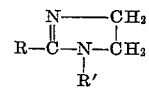

(b) 1-amidoimidazolines constituting acylation products of RCO with at least one amino group in the side chain of such 1-aminoimidazoline, (c) diimidazolines having the formula

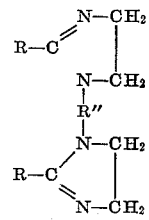

(d) amidopolyamines constituting acylation products of RCO with at least one amino group of a polyamine having the formula

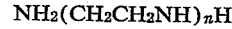

NH₂(CH₂CH₂NH)ₙH and (e) mixtures thereof, in which formulae R' is an aminoaliphatic radical containing 2–12 carbon atoms and 1–6 nitrogen atoms, R" is selected from the group consisting of the ethylene radical and aminoaliphatic radicals containing 4–10 carbon atoms and 1–4 nitrogen atoms, and n is an integer from 2 to 7 inclusive.

2. Method according to claim 1 wherein the acyl radical RCO is selected from the group consisting of oleyl, stearyl, ricinoleyl and abietyl radicals.

3. Method according to claim 1 wherein said acylation product of a triethanolamine condensation polymer is a mixture of dimer and trimer condensates acylated with RCO radicals selected from the group consisting of oleyl, stearyl, ricinoleyl and abietyl radicals.

4. Method according to claim 3 wherein said acylated polyamine constitutes a product obtained by acylating a polyamine having from 4 to 8 amino nitrogen atoms with an acyl radical selected from the group consisting of oleyl, stearyl, ricinoleyl and abietyl radicals.

5. Method according to claim 4 wherein said acylated polyamine has a composition about as follows: 10-15% aminoimidazolines; 20% diimidazolines; 50-60% amido-imidazolines; 5-10% mono-amides; 5% di-amides; and not more than 10% of other components.

6. Method according to claim 1 wherein said acylated polyamine constitutes a product obtained by acylating a polyamine having from 4 to 8 amino nitrogen atoms with an acyl radical selected from the group consisting of oleyl, stearyl, ricinoleyl and abietyl radicals.

References Cited in the file of this patent

UNITED STATES PATENTS

| | | |
|---|---|---|
| Re. 23,227 | Blair et al. | May 9, 1950 |
| 1,997,256 | Hall | Apr. 9, 1935 |
| 2,391,895 | Gunderson | Jan. 1, 1946 |
| 2,589,195 | Monson | Mar. 11, 1952 |

OTHER REFERENCES

Evans, Metallic Passivity and Protection, pp. 591-2, Repr. 1948, Edward Arnold & Co., London.